Sept. 5, 1950   R. A. ASHTON   2,521,320
COMPENSATING CHUCK WITH UNOBSTRUCTED AXIAL PASSAGE
Filed Nov. 1, 1947
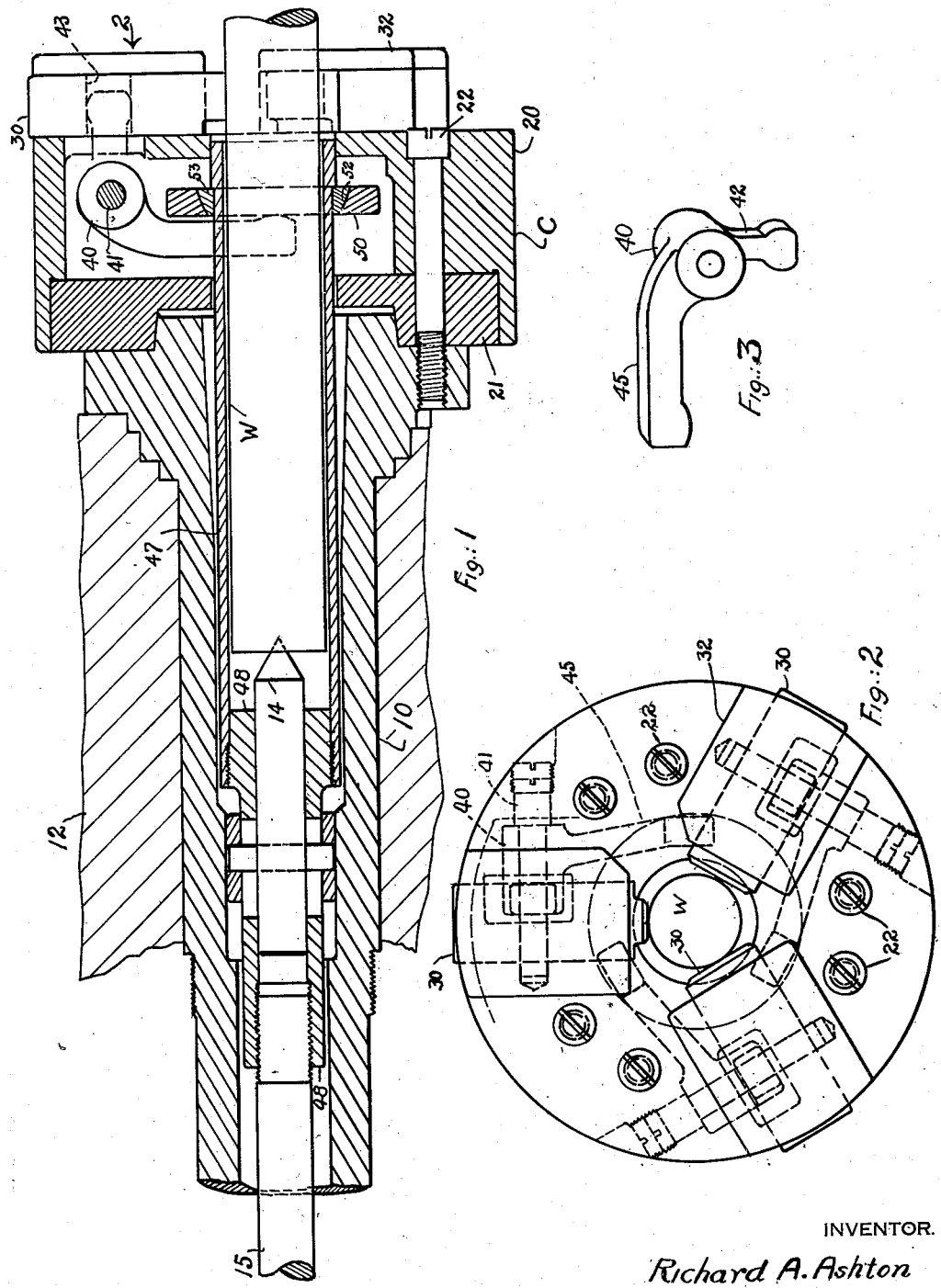
INVENTOR.
Richard A. Ashton
BY Chas. P. Hawley
ATTORNEYS.

Patented Sept. 5, 1950

2,521,320

UNITED STATES PATENT OFFICE 2,521,320

COMPENSATING CHUCK WITH UNOBSTRUCTED AXIAL PASSAGE

Richard A. Ashton, Seneca Falls, N. Y., assignor to Seneca Falls Machine Company, Seneca Falls, N. Y., a corporation of Massachusetts Application November 1, 1947, Serial No. 783,558

2 Claims. (Cl. 279—118)

This invention relates to machine tools in which shafts, rods and other similar work pieces are mounted on centers and are engaged and driven by a plurality of radially engageable chuck jaws.

It is the general object of this invention to provide a chuck in which compensating provision is made for driving slightly irregular or eccentric work pieces, and a chuck which is also constructed so that it has an unobstructed axial passage to receive an end portion of the work piece.

My invention further relates to arrangements and combinations of parts which will be hereinafter described and more particularly pointed out in the appended claims.

A preferred form of the invention is shown in the drawings, in which

Fig. 1 is a longitudinal section of my improved compensating chuck and associated parts;

Fig. 2 is an end view thereof, looking in the direction of the arrow 2 in Fig. 1; and Fig. 3 is a perspective view of a jaw-moving lever.

Referring to the drawings, I have shown a piece of work W mounted in a chuck C secured to a work-driving spindle 10, which is rotatably mounted in the usual headstock 12. The head end of the work piece W may be supported on a live center 14 which is mounted within the spindle 10 and which is movable axially by a draw bar 15.

The chuck C comprises a cylindrical member 20 and a base plate 21, both secured by clamping screws 22 to the front end of the spindle 10. Work-engaging jaws 30 are mounted to slide radially in guide members 32 formed on or secured to the outer face of the chuck member 20.

Bell crank levers 40 are pivoted at 41 in the chuck member 20 and are each provided with an arm 42 which extends into a transverse passage 43 (Fig. 1) in the associated jaw 30, and also with an arm 45 which is offset as indicated in Fig. 2 and which extends alongside a sleeve 47 (Fig. 1) which has a threaded connection 48 to the draw bar 15.

A collar 50 has a swivel bearing on a spherical surface 52 of an inner collar 53 which is formed on or secured to the front end of the sleeve 47.

The use and utility of my improved chuck is as follows:

The work piece W is inserted in the chuck and its head end may extend into the chuck and engage the live center 14. The draw bar 15 is then moved rearward, thus forcing the collar 50 against the arms 45 of the bell crank levers 40 and causing these levers to move the clamping jaws 30 inward against the work. If the work is non-circular or irregular, the collar 50 will shift on its swivel bearing 52 to equalize the pressures of the three clamping jaws.

During the chucking operation, axial pressure will be maintained on the work by a yieldingly mounted dead center or by some similar device, so that the work will be maintained in firm engagement with the live center 14 as the draw bar 15 and center 14 moves slightly to the left during advance of the clamping jaws 30.

Having thus described my invention and the advantages thereof, I do not wish to be limited to the details herein disclosed, otherwise than as set forth in the claims, but what I claim is:

1. A compensating chuck comprising a cylindrical chuck member, a plurality of jaws movable radially therein, pivoted bell crank levers engaging and effective to move said jaws and having operating arms laterally offset at one side of the chuck axis, a collar engaging said arms and having a swivel support on an inner collar, an axial tube on which said inner collar is mounted, and means to move said tube axially to slide said jaws radially and to thereby open and close said chuck.

2. A compensating chuck comprising a hollow cylindrical chuck member, a hollow supporting spindle therefor, said hollow spindle and chuck receiving one end of the work, a plurality of jaws movable radially in said chuck member, pivoted bell-crank levers mounted in said chuck and effective to move said jaws radially and said levers having operating arms substantially laterally offset at one side of the axis of the chuck, means to engage each offset operating arm at a substantial radial distance at one side of the chuck axis and substantially in a plane through said axis which is perpendicular to the path of movement of the associated jaw and to move the associated jaw inward, a live work-engaging center mounted to slide longitudinally within said chuck and spindle and engaging the work substantially within said jaws, and said bell-crank-engaging means also engaging said center and moving said center longitudinally within said tube to work-engaging position at the same time that the bell-crank levers advance the jaws to work-engaging positions.

RICHARD A. ASHTON.

REFERENCES CITED

The following references are of record in the file of this patent:

UNITED STATES PATENTS

| Number | Name | Date |
|---|---|---|
| 1,392,678 | Buhr | Oct. 4, 1921 |
| 2,224,639 | Ward | Dec. 10, 1940 |
| 2,426,376 | Smallpiece | Aug. 26, 1947 |

FOREIGN PATENTS

| Number | Country | Date |
|---|---|---|
| 109,743 | Sweden | Feb. 1944 |